US007707593B2

(12) United States Patent
Anderson et al.

(10) Patent No.: US 7,707,593 B2
(45) Date of Patent: Apr. 27, 2010

(54) OBJECT MODELS ENABLING HOSTING CONTENT IN A PLURALITY OF ENVIRONMENTS

(75) Inventors: Christopher L. Anderson, Redmond, WA (US); Margaret L. Goodwin, Lynnwood, WA (US); Mark A. Alcazar, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1352 days.

(21) Appl. No.: 11/031,548

(22) Filed: Jan. 7, 2005

(65) Prior Publication Data

US 2006/0090173 A1    Apr. 27, 2006

Related U.S. Application Data

(63) Continuation of application No. 10/974,422, filed on Oct. 26, 2004, now abandoned.

(51) Int. Cl.
*G06F 9/44* (2006.01)
(52) U.S. Cl. ...................... 719/328; 719/329
(58) Field of Classification Search ................ 719/310, 719/328, 319, 320, 329, 330
See application file for complete search history.

(56) References Cited

U.S. PATENT DOCUMENTS

| 6,226,649 | B1 * | 5/2001 | Bodamer et al. ......... 707/104.1 |
| 6,236,997 | B1 * | 5/2001 | Bodamer et al. .............. 707/10 |
| 6,449,659 | B1 | 9/2002 | Caron et al. |
| 6,473,100 | B1 * | 10/2002 | Beaumont et al. ........... 715/781 |
| 6,510,551 | B1 | 1/2003 | Miller |
| 6,526,457 | B1 | 2/2003 | Birz |
| 6,598,093 | B1 | 7/2003 | Schmidt |
| 6,618,767 | B1 | 9/2003 | Slaughter et al. |
| 6,662,356 | B1 | 12/2003 | Edwards et al. |
| 6,715,147 | B1 | 3/2004 | Barker |
| 6,717,596 | B1 | 4/2004 | Nason et al. |
| 6,742,051 | B1 | 5/2004 | Bakshi et al. |
| 6,779,027 | B1 * | 8/2004 | Schunicht et al. ........... 709/223 |
| 6,842,772 | B1 * | 1/2005 | Delaney et al. ............. 709/206 |
| 6,892,359 | B1 * | 5/2005 | Nason et al. ................ 715/788 |
| 7,093,267 | B2 * | 8/2006 | Beaumont et al. ........... 719/328 |
| 2003/0079119 | A1 | 4/2003 | LeFevre et al. |
| 2003/0110024 | A1 | 6/2003 | Broussard |
| 2004/0025170 | A1 | 2/2004 | Cao |
| 2004/0093563 | A1 | 5/2004 | Pasquali |

(Continued)

OTHER PUBLICATIONS (Unpublished) U.S. Appl. No. 10/715,804, filed Nov. 18, 2003 by Goodwin et al., entitled "Application Model That Integrates The Web Experience With The Traditional Client Application Experience".

(Continued)

*Primary Examiner*—Van H Nguyen

(57) ABSTRACT

Software programming models are provided for supporting host-environment agnostic content that can be hosted in different hosting environments (e.g., browser or window) without needing to rewrite the content. The models comprise a host-environment abstraction wrapper that provides a transparent layer of abstraction between content and host-environment specific instructions. The host-environment abstraction wrapper supports the use of host-environment independent interaction instructions or declarative statements in content by invoking host-environment specific implementation details on behalf of the content. The host-environment independent interaction instructions represent particular interactions between some content and a hosting environment, but do not provide host-environment implementation instructions that are specific to any particular hosting environment.

12 Claims, 7 Drawing Sheets

U.S. PATENT DOCUMENTS

| | | |
|---|---|---|
| 2004/0122940 A1 | 6/2004 | Gibson et al. |
| 2004/0123306 A1 | 6/2004 | Gazda et al. |
| 2004/0167867 A1* | 8/2004 | Owen et al. .................... 707/1 |
| 2004/0172443 A1 | 9/2004 | Alcazar et al. |
| 2004/0172635 A1 | 9/2004 | Watt et al. |
| 2004/0177361 A1 | 9/2004 | Bernhard et al. |
| 2004/0243663 A1* | 12/2004 | Johanson et al. ............ 709/200 |
| 2005/0172282 A1* | 8/2005 | Shenfield et al. ............ 717/174 |

OTHER PUBLICATIONS

Christopher Anderson "Avalon: Creating Windows "Longhorn" User Experiences (Part 1): Application Model Fundamentals", Speaker Notes, 2003.

Christopher Anderson "Avalon: Creating Windows "Longhorn" User Experiences (Part 1): Application Model Fundamentals", Slide Presentation, PDC 2003.

* cited by examiner

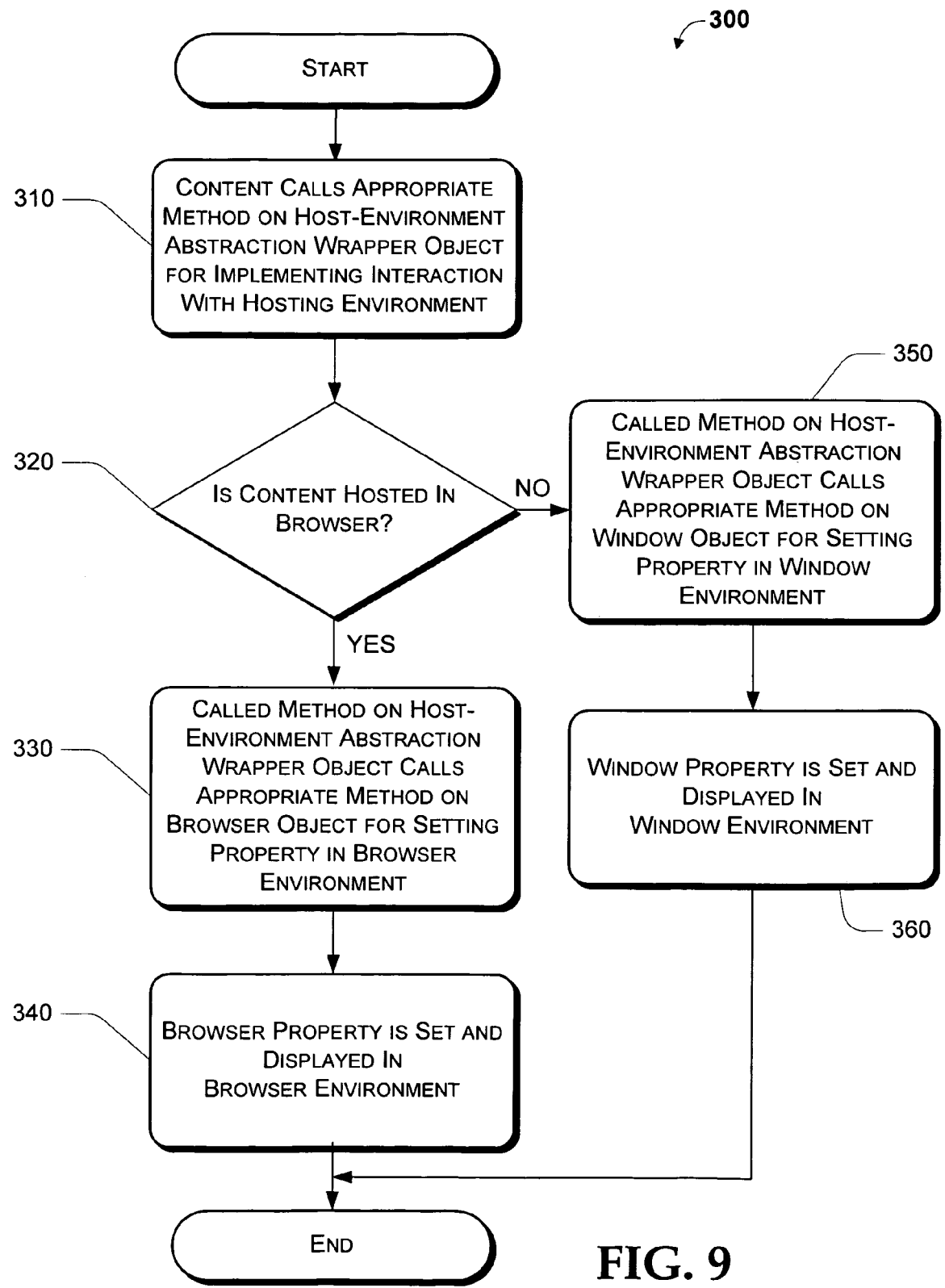

OBJECT MODELS ENABLING HOSTING CONTENT IN A PLURALITY OF ENVIRONMENTS

This application is a continuation of earlier filed U.S. application Ser. No. 10/974,422, filed on Oct. 26, 2004, upon which priority under 35 U.S.C. §120 is claimed to, which is incorporated by reference herein in its entirety.

FIELD OF TECHNOLOGY

The technology relates generally to software architecture and, more particularly, to programmatic models for hosting content in a variety of environments.

BACKGROUND

Traditional client software applications are often developed for hosting in a standalone window environment and Web applications are often developed for hosting in a browser environment, for example. Software developed as client applications typically include window-environment specific code that enables the applications to interact with their window hosting environment, and Web application software typically includes browser-environment specific code for interacting with their browser hosting environment. When a software application is developed for hosting in a particular environment, the application has to be executed in that environment.

SUMMARY

The following presents a simplified summary of the disclosure in order to provide a basic understanding to the reader. This summary is not an exhaustive or limiting overview of the disclosure. The summary does not identify key and/or critical elements in the ensuing claims, nor does this summary delineate or limit the scope of the ensuing claims in any way. Its sole purpose is to present some of the concepts disclosed in a simplified form as an introduction to the more detailed description that is presented later.

This disclosure provides software programming models for hosting content in a variety of environments. Content developed according to these models, such as software applications, can be executed in different hosting environments without needing to rewrite the software application's source code. The models comprise programmatic infrastructures, such as a host-environment abstraction wrapper, which provide a transparent layer of abstraction between a software application's source code and host-environment specific instructions.

The programmatic infrastructures support the use of host-environment independent interaction instructions in software application source code. The host-environment independent interaction instructions represent particular interactions between a software application and any hosting environment which is ultimately selected for hosting the application. The host-environment independent interaction instructions, however, are not specific to any particular hosting environment.

When a particular hosting environment is selected for hosting a software application developed in the manner disclosed herein, the programmatic infrastructures provide the host-environment specific implementation details for effecting the hosting environment interactions expressed by the host-environment independent interaction instructions used in the software application's source code. This frees software developers from needing to use host-environment specific interaction instructions in software application source code. Further, developers can create software source code without even knowing in which hosting environment the software application will ultimately be hosted.

BRIEF DESCRIPTION OF THE DRAWINGS

The foregoing summary will become more readily appreciated as the same becomes better understood by reference to the following detailed description, when taken in conjunction with the accompanying drawings, wherein:

FIG. 9 is a flow chart of at least a portion of an exemplary process that may be used to execute host-environment independent content.

DETAILED DESCRIPTION

Figure 1:
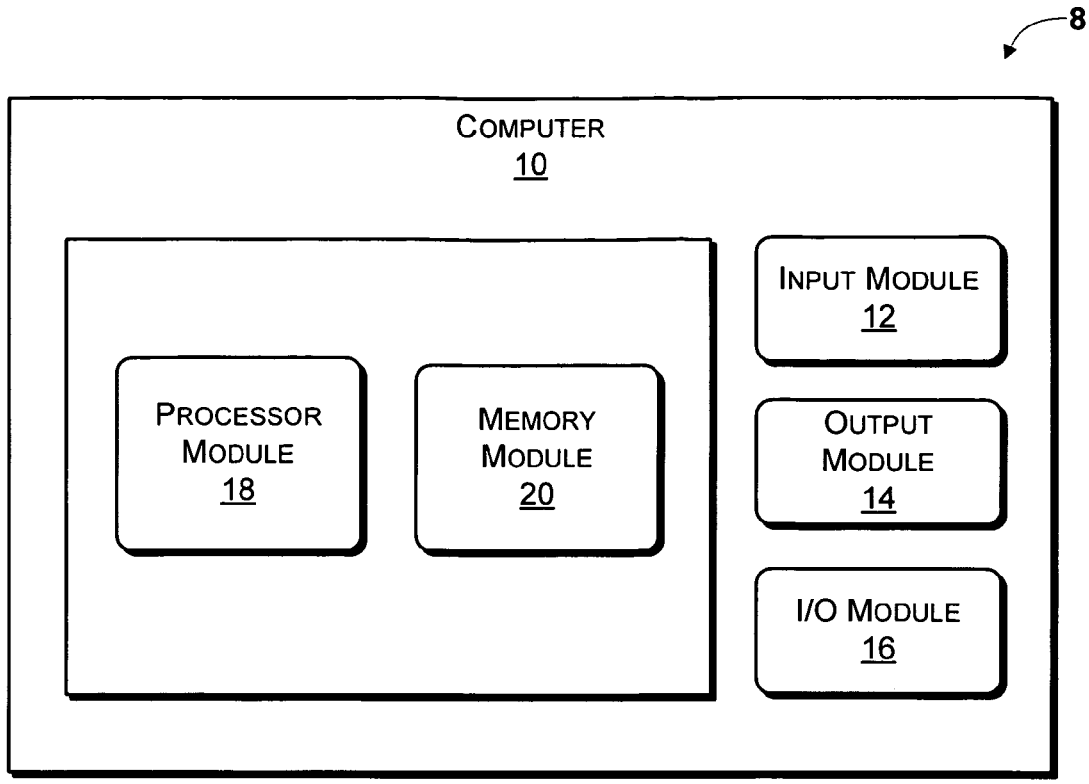
FIG. 1 is a block diagram of an exemplary device that may be used for developing and/or executing host-environment independent content.

An example of a system 8 that may be used to implement method 100 for developing host-environment independent content and/or methods 200 and 300 for executing host-environment independent content are generally shown in FIGS. 1, 3 and 5-9. System 8 includes computer 10, although system 8 may include a lesser or greater number of devices. System 8 can be used to develop host-environment independent content 102 that may be executed in different hosting environments without needing to rewrite the content 102 for each hosting environment.

Figure 5:
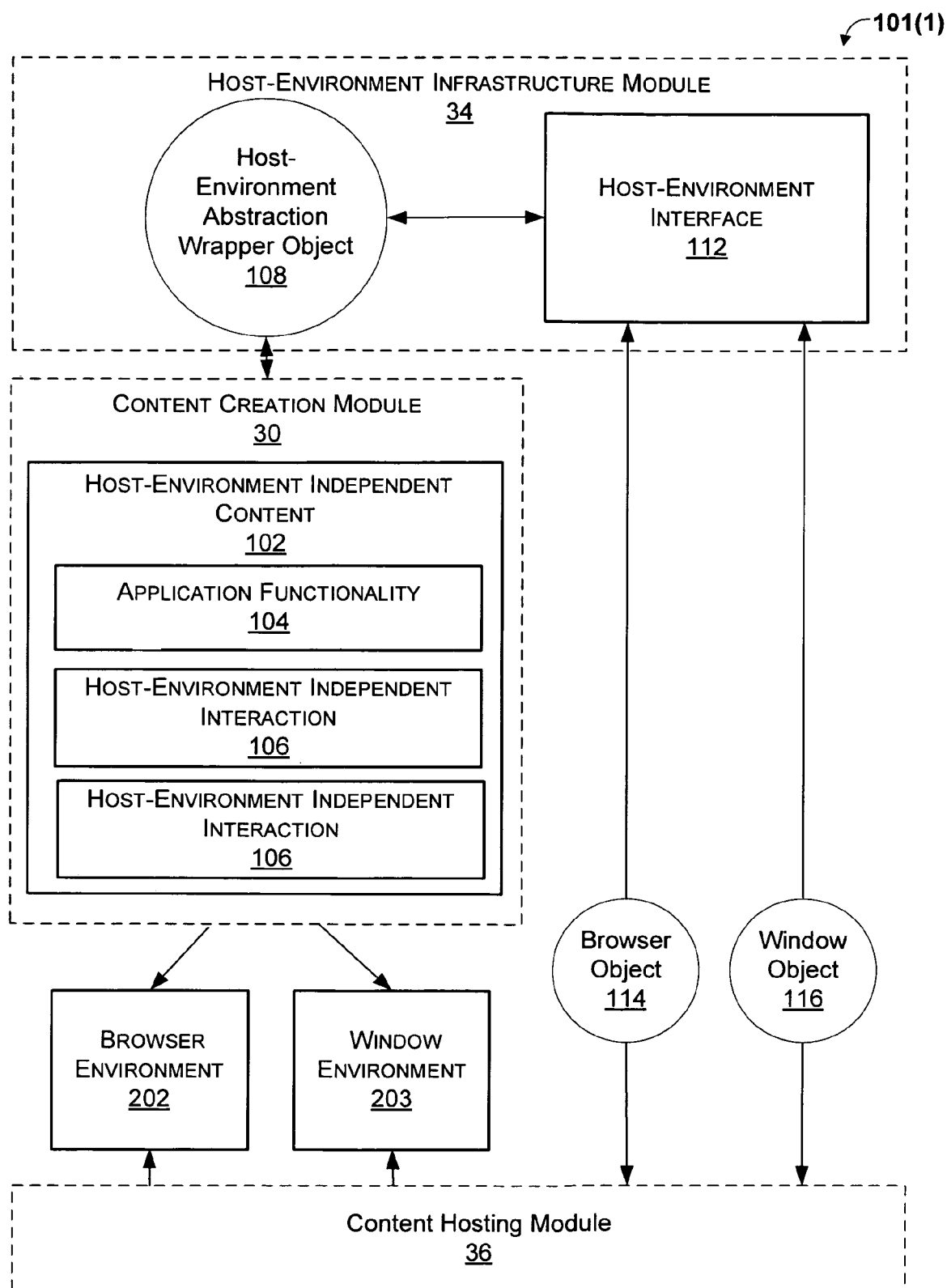
FIGS. 5-6 are diagrams of exemplary host-environment independent programming models that may be used to support host-environment independent content.
Figure 6:
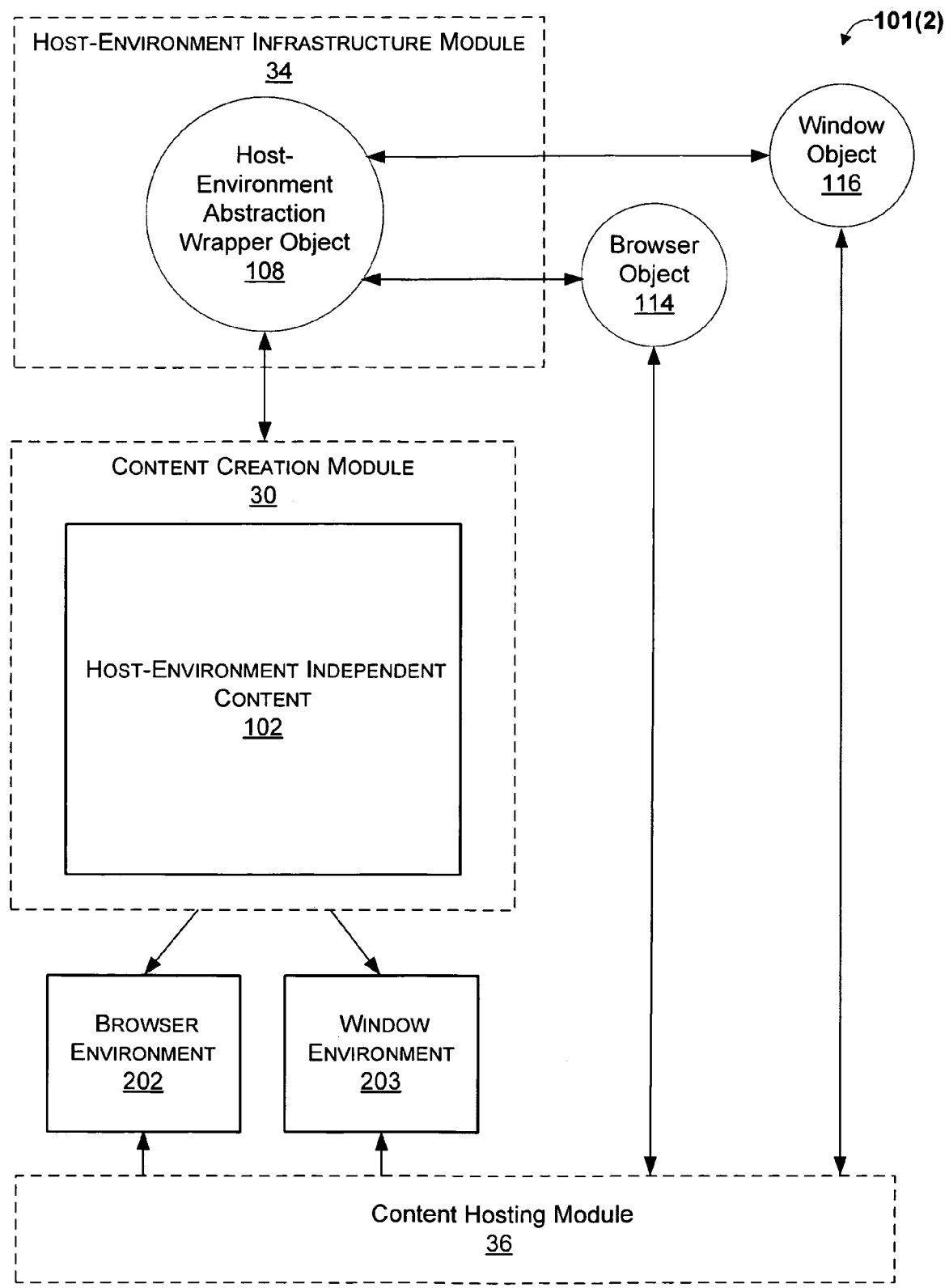

Basically, host-environment independent content 102 is developed by including in the content 102 one or more host-environment independent interactions 106 that are supported by a host-environment abstraction wrapper object 108 and one or more other supporting components shown in FIGS. 5-6. The host-environment abstraction wrapper object 108 and other supporting components provide host-environment specific implementation details for effecting the hosting environment interactions expressed by the host-environment independent interactions 106 included in the content 102. The system 8 for developing and/or executing the content 102 will now be described in further detail herein below.

Referring specifically to FIG. 1, computer 10 is provided for exemplary purposes only and may comprise other devices, such as server computing systems, laptop or notebook computers, personal digital assistants, cellular telephones or any other device or combination of devices. In its most basic configuration, computer 10 comprises input module 12, output module 14, I/O module 16, processor module 18, and memory module 20, which are coupled together by one or more bus systems or other communication links, although computer 10 may comprise other elements in other arrangements. Modules 12, 14, 16, 18 and 20 will now be described below with continued reference to FIG. 1.

Input module 12 comprises one or more user input devices, such as a keyboard and/or mouse, and any supporting hardware. Input module 12 enables a user who is operating computer 10 to generate and transmit signals or commands to processor module 18, such as commands for launching executable content 122, although other types of user input devices may be used.

Output module 14 comprises one or more user output devices, such as a computer monitor (e.g., CRT, LCD or plasma display), and any supporting hardware, although other types of output devices may be used. Output module 14 presents one or more results from processor module 18 executing instructions stored in memory module 20 as described in further detail herein below.

I/O module 16 comprises one or more communication interface devices, such as a network interface card (e.g., Ethernet card or wireless network card), and any supporting hardware, although other types of communication interface devices may be used, such as a serial interface (e.g., RS-232 interface). I/O module 16 enables computer 10 to transmit or receive data to or from other devices, such as other computing systems or peripherals (e.g., external memory storage device or printer), via a network or direct cable connection, for example.

Processor module 18 accesses and/or executes data and instructions stored in memory module 20 for controlling, monitoring and managing (hereinafter referred to as "operating") input module 12, output module 14, I/O module 16 and memory module 20 as described herein, although some or all of the data and instructions may be stored in and/or executed by the modules themselves. Additionally, processor module 18 accesses and/or executes data and instructions stored in memory module 20 to perform functions for implementing at least a portion of the methods 100, 200 and 300 as described herein and illustrated in FIGS. 3, 7, and 9, respectively, although processor module 18 may perform other functions, one or more other processing devices or systems may perform some or all of these functions, and processor module 18 may comprise circuitry configured to perform the functions described herein.

Memory module 20 comprises one or more types of fixed and/or portable computer-readable media, such as computer storage media including ROM, RAM, SRAM, DRAM, DDRAM, hard and floppy-disks, CDs, DVDs, magnetic tape, optical disk, ferroelectric and ferromagnetic memory, electrically erasable programmable read only memory, flash memory, charge coupled devices, smart cards, or any other type of computer-readable media, which may be read from and/or written to by one or more magnetic, optical, or other appropriate reading and/or writing systems coupled to processor module 18 and/or one or more other processing devices or systems.

Memory module 20 stores at least a portion of the data and instructions that are accessed and/or executed by processor module 18 for operating input module 12, output module 14, I/O module 16, processor module 18 and memory module 20, although some or all of the data and instructions may be stored elsewhere, such as in the modules themselves and/or the processor module 18.

Figure 2:
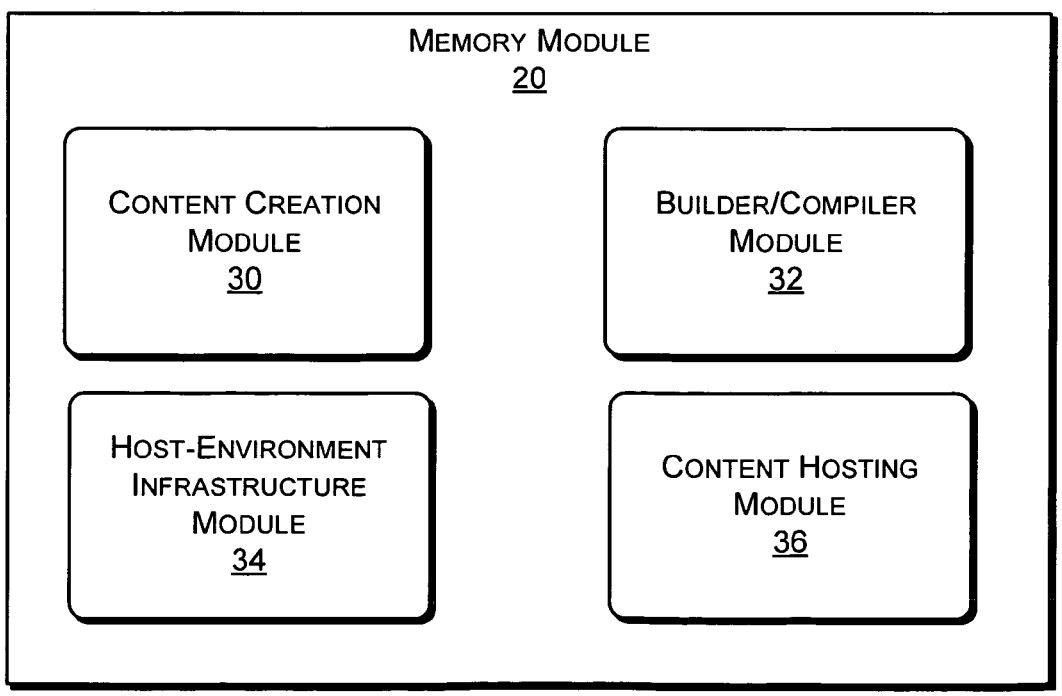
FIG. 2 is a functional block diagram of exemplary modules stored in the memory of the device illustrated in FIG. 1.

Referring now to FIG. 2, memory module 20 also stores content creation module 30, builder/compiler module 32, host-environment infrastructure module 34 and content hosting module 36. Modules 30, 32, 34 and 36 comprise data and/or instructions written in one or more programming languages, which when accessed and/or executed by processor 18, cause computer 10 to implement at least a portion of the methods 100, 200 and 300, as described herein and illustrated in FIGS. 3, 7 and 9, respectively, although the modules may comprise circuitry configured to operate in the manner described herein.

For ease of description and exemplary purposes only, modules 30, 32, 34 and 36 are shown in FIG. 2 as four separate modules stored in memory module 20. However, a fewer or greater number and other types of modules may be used. Moreover, one or more modules 30, 32, 34 and 36 may reside on one or more other computing systems or devices and one or more of the modules may be combined or separated. Modules 30, 32, 34 and 36 will now be described below with continued reference to FIG. 2.

Content creation module 30 comprises one or more mechanisms including a word processor or text editor application and/or a programming code or script generator application, and is used to generate host-environment agnostic content, such as host-environment independent content 102 illustrated in FIGS. 5-6 and described in connection with method 100 further herein below, although the module 30 may also be used to generate one or more program modules associated with the content 102, also described in connection with method 100.

Builder/compiler module 32 comprises one or more mechanisms used to generate an executable application, such as an executable version of host-environment independent content 102 illustrated as executable content 122 in FIG. 4 and described in connection with method 100 further herein below, although the content 122 could comprise interpreted or declarative content.

Host-environment infrastructure module 34 comprises one or more dynamic-link libraries that include one or more compiled components from host-environment independent programming models 101(1) and/or 101(2), such as host-environment abstraction wrapper object 108 and host-environment interface 112, although one or more of the components may comprise intermediate language instructions.

Content hosting module 36 comprises one or more mechanisms, such as a shell, file type extension/mime-type handlers, browser and window environment servers, and code sniffers, used to host an executable application (e.g., executable content 122 shown in FIGS. 4 and 8) in one or more selected hosting environments in the manner described further herein below in connection with method 200.

An example of the mechanisms in content hosting module 36 that may be used to host content in one or more hosting environments is disclosed in U.S. patent application Ser. No. 10/715,707 to Alcazar et al., entitled "HOSTING AN APPLICATION IN ONE OF A PLURALITY OF EXECUTION ENVIRONMENTS," filed Nov. 18, 2003; and U.S. patent application Ser. No. 10/715,804 to Goodwin et al., entitled "APPLICATION MODEL THAT INTEGRATES THE WEB EXPERIENCE WITH THE TRADITIONAL CLIENT APPLICATION EXPERIENCE," filed Nov. 18, 2003, both of which are incorporated herein by reference in their entirety.

An example of a method 100 for developing host-environment independent content will now be described with reference to FIGS. 3-6 in the context of being carried out by system 8 described above in connection with FIGS. 1-2, although one or more other systems could carry out this method or portions thereof.

Figure 3:
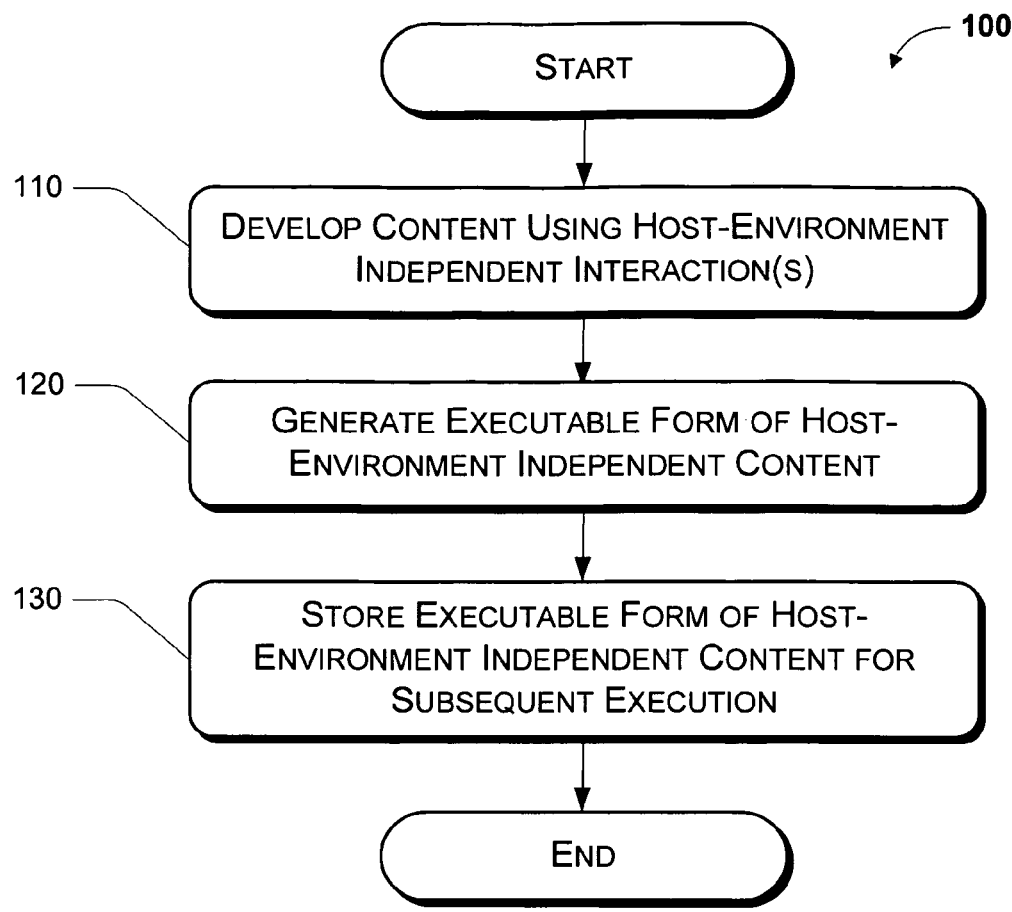
FIG. 3 is a flow chart of at least a portion of an exemplary process that may be used to develop host-environment independent content.
Figure 4:
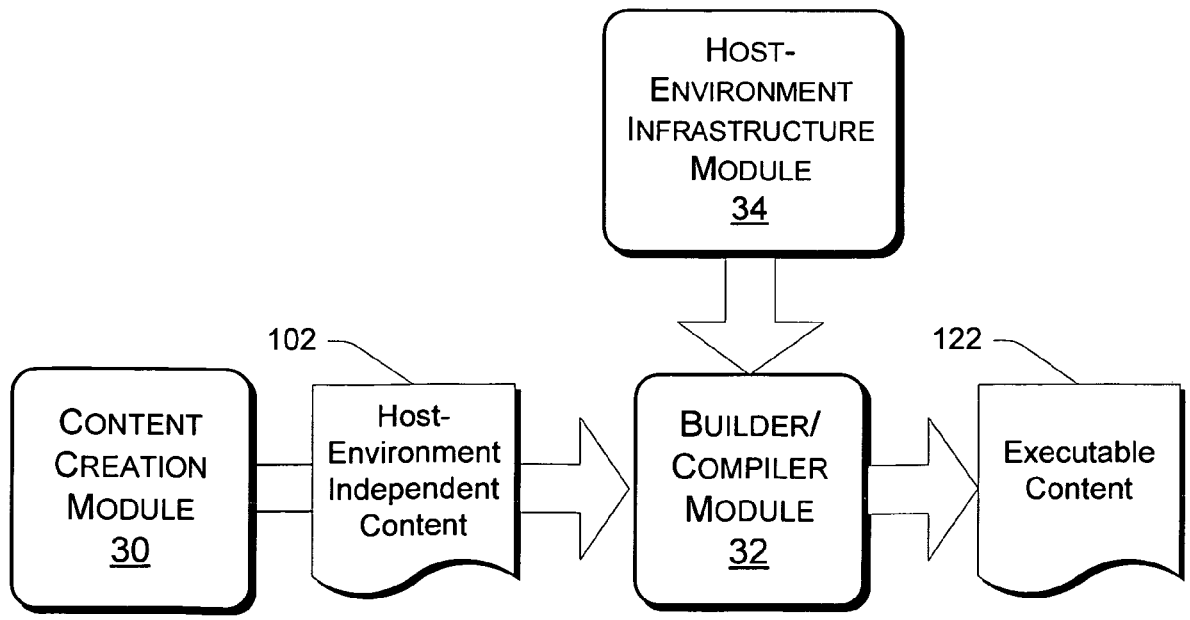
FIG. 4 is a functional block diagram of at least a portion of the process for developing host-environment independent content illustrated in FIG. 3.

Referring now to FIGS. 3-4, and beginning the method 100 at step 110, by way of example only, a user of computer 10, such as a content developer, in conjunction with operation of input module 12, output module 14, I/O module 16, processor module 18 and memory module 20, operates content creation module 30 to generate host-environment independent content 102.

Host-environment independent content 102, and ultimately an executable version thereof, may be supported by a host-environment independent programming model 101(1) shown in FIG. 5, although other programmatic models could be employed as described further herein below in connection with FIG. 6. The components in model 101(1) that support the host-environment independent content 102 comprise host-environment abstraction wrapper object 108, host-environment interface 112, browser object 114 and window object 116. The host-environment independent content 102 and each of these supporting components will be described further herein below. A pseudo-code example will also be provided following each description.

It should be appreciated, however, that the pseudo-code examples for these supporting components are provided for explanatory and demonstrative purposes only and, in practice, the host-environment independent content 102 and the supporting components may be expressed in a variety of other manners, such as actual programming language statements or declaratives where a markup language is used, such as XAML, without undue experimentation. Moreover, these pseudo-code examples are not intended to recite complete programming language or code statements that are ready for compilation, and they may include more or less information. As such, host-environment independent content 102 will now be described below with continued reference to FIG. 5.

Generally, host-environment independent content 102 comprises the source code of a software application that is host-environment agnostic, although content 102 may comprise intermediate language, compiled code, markup language and other information. Host-environment independent content 102 includes one or more references (not illustrated) to one or more locations, such as one or more dynamic-linked libraries where the supporting components (e.g., host-environment abstraction wrapper object 108) are stored, although content 102 might not include these references where the components are globally available.

As shown in FIG. 5, host-environment independent content 102 comprises application functionality 104 and one or more host-environment independent interactions 106, although the interactions 106 may be located elsewhere apart from the content 102. The arrangement of application functionality 104 and host-environment independent interaction 106 within host-environment independent content 102 in FIG. 5 is provided for ease of description and exemplary purposes only.

Application functionality 104 represents the logic of a software application embodied by host-environment independent content 102. Specifically, application functionality 104 comprises one or more software application specific instructions expressed as programming statements written in one or more programming languages, although the instructions may be expressed as markup language statements or declaratives, and functionality 104 may comprise other information besides instructions.

Host-environment independent interactions 106 are each associated with a particular interaction involving the software application embodied by host-environment independent content 102 and a hosting environment (e.g., browser environment 202, window environment 203) in which the content 102 is ultimately hosted. An example of such a hosting environment interaction involves setting a particular property of a browser or window (e.g., title to be displayed in window/browser frame, text color in window/browser frame, window/browser frame size) where an executable form of the host-environment independent content 102 is hosted during execution. However, host-environment independent interactions 106 themselves do not provide the implementation details for implementing the interactions and are not specific to any particular hosting environment.

Host-environment independent interactions 106 enable the user of computer 10, such as a content developer, to express their desired host-environment interaction within host-environment independent content 102 without needing to provide the implementation details for the interaction. Also, the content developer does not even need to know which particular hosting environment the host-environment independent content 102 will ultimately be hosted in at the time the content 102 is developed. The host-environment independent interactions 106 also enable the content developer to express the interaction using a single instruction Instead of potentially several instructions, although one or more of the interactions 106 could comprise several instructions.

A pseudo-code example of a host-environment independent interaction 106 that may be used in the host-environment independent content 102 for setting a title property in a hosting environment, for instance, is provided below:

---
Host-Environment Independent Interaction
Pseudo-Code Example:

:
Host-Environment_Abstraction_Wrapper.SetTitle("foo");
:

---

The portion of the host-environment independent interaction pseudo-code comprising "Host-Environment_Abstraction_Wrapper.SetTitle" represents a call to a "SetTitle" method on the host-environment abstraction wrapper object 108 shown in FIG. 5.

Generally, host-environment abstraction wrapper object 108 makes host-environment specific instructions available for actually implementing the interactions expressed in the host-environment independent interactions 106. Specifically, host-environment abstraction wrapper object 108 comprises one or more instructions that reference one or more other instructions (e.g., attributes, methods, events) exposed by the hosting environment (e.g., browser and window objects 114, 116, respectively) to the wrapper 108 for implementing the expressed interactions in the hosting environment. The wrapper object 108 thus invokes these host-environment specific instructions on behalf of the interactions 106 expressed in the content 102 as described in further detail herein below.

In particular, the wrapper object 108 provides one or more methods that may be referenced by the interactions 106 for setting properties in a selected hosting environment, although the wrapper object 108 may provide attributes or properties and events that may be referenced by the interactions 106. Thus, the interactions 106 may be used for calling one or more of these methods on the object 108, for setting one or more attributes or properties on the object 108, or for registering one or more event handlers for one or more events on the object 108 to call one or more methods, set one or more properties, or register one or more events on a hosting environment where an executable version of the content 102 is hosted.

A pseudo-code example of a portion of a "Host-Environment_Abstraction_Wrapper" class representing an application program interface ("API") that may be instantiated into host-environment abstraction wrapper object 108 is provided below:

---
"Host-Environment_Abstraction_Wrapper" Class
Pseudo-Code Example:
---

```
    :
Class Host-Environment_Abstraction_Wrapper :
Implements IHostEnvironmentService
{
    :
IHostEnvironmentService Environment_Object;
    :
Public:
    :
Void SetTitle(string Title_Value)
    {
        Environment_Object.Set_Title(Title_Value);
    }
    :
}
    :
```

---

The portion of the "Host-Environment_Abstraction_Wrapper" class pseudo-code comprising "Void SetTitle (string Title_Value)" defines the "SetTitle" method referenced by the host-environment independent interaction pseudo-code provided earlier for interaction 106. The "Title_Value" variable receives the "foo" value passed in from the host-environment independent interaction pseudo-code. The "SetTitle" method actually initiates or causes the host-environment specific instructions to be executed for implementing the interaction expressed in the host-environment independent interaction pseudo-code provided earlier.

The host-environment specific instructions are accessible in this model 101(1) by way of the host-environment interface 112 shown in FIG. 5. The host-environment interface 112 enables the browser object 114 and the window object 116 to expose one or more instructions (e.g., methods, events, attributes) to the host-environment abstraction wrapper object 108 for actually implementing the interactions expressed in the host-environment independent interactions 106.

A pseudo-code example of a portion of an "IHostEnvironmentService" interface that may be used for the host-environment interface 112 is provided below:

---
"IHostEnvironmentService" Interface Pseudo-Code Example:
---

```
        :
    Public Interface IHostEnvironmentService
    {
        :
        Void Set_Title(string Title);
        :
    }
        :
```

---

The portion of the "IHostEnvironmentService" interface pseudo-code comprising "Public Interface IHostEnvironmentService" defines the "IHostEnvironmentService" interface and the portion comprising "Void Set_Title(string Title)" represents a method signature for a method that should be implemented by any object or component that implements the Interface. Here, browser object 114 and window object 116 shown in FIG. 5 may implement the host-environment interface 112.

Generally, the browser object 114 and window object 116 each have instructions comprising methods, attributes and events that describe and enable interacting with a particular hosting environment (e.g., browser or window frame) that hosts some content, such as an executable form of host-environment independent content 102 (e.g., executable content 122). Further, the browser object 114 and window object 116 each have their own unique instructions for actually implementing the interactions expressed in the host-environment independent interactions 106 in their own way.

A pseudo-code example of a portion of a "Browser" class that may be instantiated into browser object 114 is provided below:

---
"Browser" Class Pseudo-Code Example:
---

```
    :
Class Browser implements IHostEnvironmentService
{
Public:
    :
String Browser_Frame_Title_Property;
    :
Void Set_Title(string Title)
    {
        Browser_Frame_Title_Property=Title;
    }
    :
}
    :
```

---

The portion of the "Browser" class pseudo-code comprising "Void Set_Title(string Title)" implements the "Set_Title" method defined in the "IHostEnvironmentService" interface pseudo-code provided above earlier in a manner specific for a browser environment. Specifically, the portion of the "Browser" class pseudo-code comprising "Browser_Frame_Title_Property=Title" sets a title property on browser object 114 to have the "foo" value passed in from host-environment abstraction wrapper object 108, which in turn received the "foo" value from host-environment independent interaction 106 pseudo-code provided above earlier.

A pseudo-code example of a portion of a "Window" class that may be instantiated into window object 116 is provided below:

---
"Window" Class Pseudo-Code Example:
---

```
    :
Class Window implements IHostEnvironmentService
{
Public:
    :
String Window_Title_Property;
    :
Void Set_Title(string Title)
    {
        Window_Title_Property=Title;
    }
    :
}
    :
```

---

The portion of the "Window" class pseudo-code comprising "Void Set_Title(string Title)" implements the "Set_Title" method defined in the "IHostEnvironmentService" interface pseudo-code provided above earlier in a manner specific for a window environment, such as a standalone window. Specifically, the portion of the "Window" class pseudo-code comprising "Window_Title_Property=Title" sets a title property on window object 116 to have the "foo" value passed in from host-environment abstraction wrapper object 108, which in turn received the "foo" value from host-environment independent interaction 106 pseudo-code.

Other examples of a "Browser" and a "Window" class that may be instantiated into objects 114 and 116, respectively, are disclosed in U.S. patent application Ser. No. 10/715,804 to Goodwin et al., entitled "APPLICATION MODEL THAT INTEGRATES THE WEB EXPERIENCE WITH THE TRADITIONAL CLIENT APPLICATION EXPERIENCE," filed Nov. 18, 2003, which has already been incorporated herein by reference in its entirety.

The content hosting module 36 provides the browser object 114 and/or window object 116 when an executable version of the host-environment independent content 102 (e.g., executable content 122) is launched for execution in a selected hosting environment in method 200 described further below. The particular objects 114, 116 that are provided depend upon which hosting environment is ultimately selected and indicated for hosting the content 102, also described further below in connection with method 200.

Referring back to the "Host-Environment_Abstraction_Wrapper" class pseudo-code example provided above earlier for the host-environment abstraction wrapper object 108, the portion comprising "Environment_Object.Set_Title" represents a call to the "Set_Title" method on the "Environment_Object" interface (e.g., host-environment interface 112) that is implemented by the browser object 114 and the window object 116 in this model 101(1). Moreover, the portion of the pseudo-code comprising "IHostEnvironmentService Environment_Object" represents the "Environment_Object" property being of the type "IHostEnvironmentService" (e.g., host environment interface 112).

The "Environment_Object" property represents a host environment (e.g., browser environment 202 or window environment 203), regardless of which environment an executable version of the host-environment independent content 102 (e.g., executable content 122) is actually hosted in at method 200, and is used in this model 101(1) by the host environment abstraction wrapper object 108 to communicate with the host environment (e.g., browser environment 202 or window environment 203) via browser object 114 or window object 116.

Thus, the content hosting module 36 makes the object 114 or object 116 available to the host-environment abstraction wrapper object 108 by setting the host-environment interface 112 property to reference the actual host-environment object (e.g., browser object 114 or window object 116). As such, the "Host-Environment_Abstraction_Wrapper" class pseudo-code (e.g., wrapper object 108) may simply invoke the "Set_Title" method on either object 114 or 116 using the "Environment_Object.Set_Title" pseudo-code to set a title property, for instance, in either hosting environment, as mentioned above earlier.

The content developer does not need to know the underlying details of the host-environment abstraction wrapper object 1108, host-environment interface 112, browser object 114 and window object 116 to be able to develop host-environment independent content 102. It is sufficient for the developer to know one or more methods, events and/or attributes that are available via host-environment abstraction wrapper object 108 for using host-environment independent interactions 106 in developing host-environment independent content 102.

Referring now to FIG. 6, a host-environment independent programming model 101(2) that may also be employed to support host-environment independent content 102, and ultimately an executable version thereof, will now be described. Like reference numbers in FIG. 6 are identical to those in and described with reference to FIG. 5. Further, host-environment independent programming model 101(2) is identical to model 101(1) described above in connection with FIG. 5, except as described below.

Host-environment abstraction wrapper object 108 in model 101(2) may directly reference instructions on the browser object 114 and the window object 116 for implementing the host-environment independent interactions 106 without using host-environment interface 112.

A pseudo-code example of a portion of a "Host-Environment_Abstraction_Wrapper" class API that may be instantiated into host-environment abstraction wrapper object 108 which directly references instructions on the objects 114 and 116 is provided below:

"Host-Environment_Abstraction_Wrapper" Class
Pseudo-Code Example:

```
:
Class Host-Environment_Abstraction_Wrapper
    :
{
Public:
    :
Void SetTitle(string Title_Value)
{
    If (Selected_Environment=BROWSER)
    {
        Browser.Title=Title_Value;
    };
    ELSE
    {
        Window.Title=Title_Value;
    }
}
    :
}
    :
```

The portion of the "Host-Environment_Abstraction_Wrapper" class pseudo-code comprising "Browser.Title=Title_Value" sets a title property on browser object 114 to have the "foo" value passed into the wrapper 108 pseudo-code from the host-environment independent interaction 106 pseudo-code provided above earlier in connection with model 101(1). The portion of the "Host-Environment_Abstraction_Wrapper" class pseudo-code comprising "Window.Title=Title_Value" sets a title property on window object 116 to have the "foo" value passed into the wrapper 108 pseudo-code.

Whichever one of objects 114 or 116 have their "Title" property assigned the "foo" value by way of the "IF" and "ELSE" pseudo-code depends on the result of the "Selected_Environment=BROWSER" test in the pseudo-code provided for the wrapper object 108. The purpose of the "Selected_Environment=BROWSER" test is to determine the active hosting environment. This could be determined by checking a Boolean variable that is set when the host-environment abstraction wrapper object 108 is instantiated, although the wrapper object 108 could include its own logic to check which environment it is hosted in.

It should be noted that this implementation, in which the host-environment abstraction wrapper object 108 directly references the instructions on the objects 114 and 116 in model 101(2), could be used in a programming language that does not support interfaces, in which case the objects 114 and 116 could not implement the host-environment interface 112.

It should also be noted that the same host-environment independent interactions 106 in host-environment independent content 102 described above in connection with model 101(1) may be used in this model 101(2) since the underlying details of the host-environment abstraction wrapper object 108, browser object 114, and window object 116 are transparent to the computer 10 user (e.g., content developer). Step 120 in method 100 will now be described below with reference back to FIGS. 3 and 4.

At step 120, content creation module 30 sends host-environment independent content 102 to builder/compiler module 32 to be compiled into executable content 122, although module 32 may receive or retrieve content 102 from other sources. While executable content 122 is illustrated in FIG. 4 as a single program module, it may in fact comprise several modules.

By way of example only, a user of computer 10, such as a content developer, operates builder/compiler module 30 to generate executable content 122. Specifically, the computer 10 user operates builder/compiler module 32 to generate several program modules (not illustrated), including a settings module and one or more supporting code modules, although the computer 10 user may generate one or more of these program modules, or portions thereof, themselves by operating content creation module 30 to generate the information for these modules, the modules may have already been generated, or the modules may be provided or retrieved from another source.

The settings module includes information about how host-environment independent content 102 will be compiled and executed, such as information provided in a manifest file by the computer 10 user (e.g., content developer) that indicates a particular hosting environment in which the executable version of the host-environment independent content 102 will be hosted (e.g., browser environment 202 or window environment 203), although this information may be provided in other ways, such as in the form of a compile time directive. The supporting code modules include components from the host-environment infrastructure module 34 and the content hosting module 36, although the supporting code modules may include other types of modules and may include modules from other sources.

Basically, builder/compiler module 32 compiles host-environment independent content 102, together with the settings module and any supporting code modules, into executable content 122 utilizing an early bind technique, although a late binding technique may be utilized. Where an early binding technique is utilized, one or more of the supporting code modules in the executable content 122 comprise components from models 101(1) or 101(2) that are specific to the hosting environment indicated in the settings module. To enable the executable content 122 to be hosted in a different hosting environment than the hosting environment indicated in the settings module when the content 102 was compiled, the settings module could be modified to indicate the desired hosting environment and the host-environment independent content 102 could then be recompiled, although the host-environment independent content 102 would not need to be modified.

Where a late binding technique is utilized, one or more of the supporting code modules in the executable content 122 comprise logic for accessing components from models 101(1) or 101(2) that are specific to the hosting environment indicated in the settings module during execution. Here, a content developer can change the hosting environment for the executable content 122 simply by modifying the settings module to indicate the desired hosting environment without recompiling the host-environment independent content 102 or modifying the content 102 itself. In either case, executable content 122 represents a compiled, executable version of the host-environment independent content 102 that may be executed in the selected hosting environment indicated in the settings module or some other fashion as described further herein below in connection with method 200, although the content 122 could represent interpreted language or declarative markup language.

At step 130, builder/compiler module 32 stores executable content 122 in memory module 20, although executable content 122 may be stored in other locations, and the method 100 ends.

An exemplary method 200 for executing host-environment independent content will now be described with reference to FIGS. 7-8 in the context of being carried out by system 8 described above in connection with FIGS. 1-2. Like reference numbers in FIG. 8 are identical to those in and described in connection with FIGS. 1, 2 and 4-6.

Figure 7:
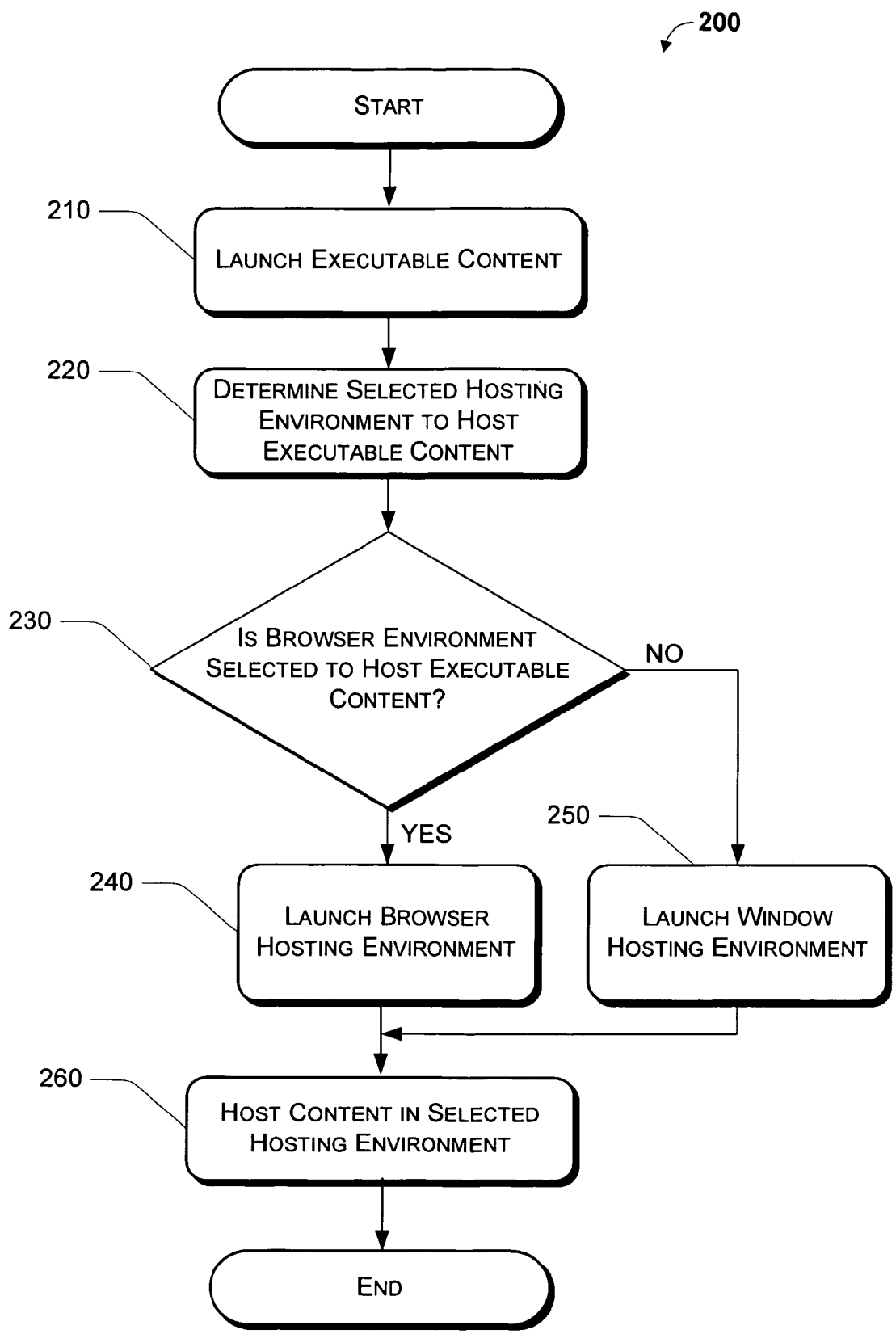
FIG. 7 is a flow chart of at least a portion of an exemplary process that may be used to execute host-environment independent content.
Figure 8:
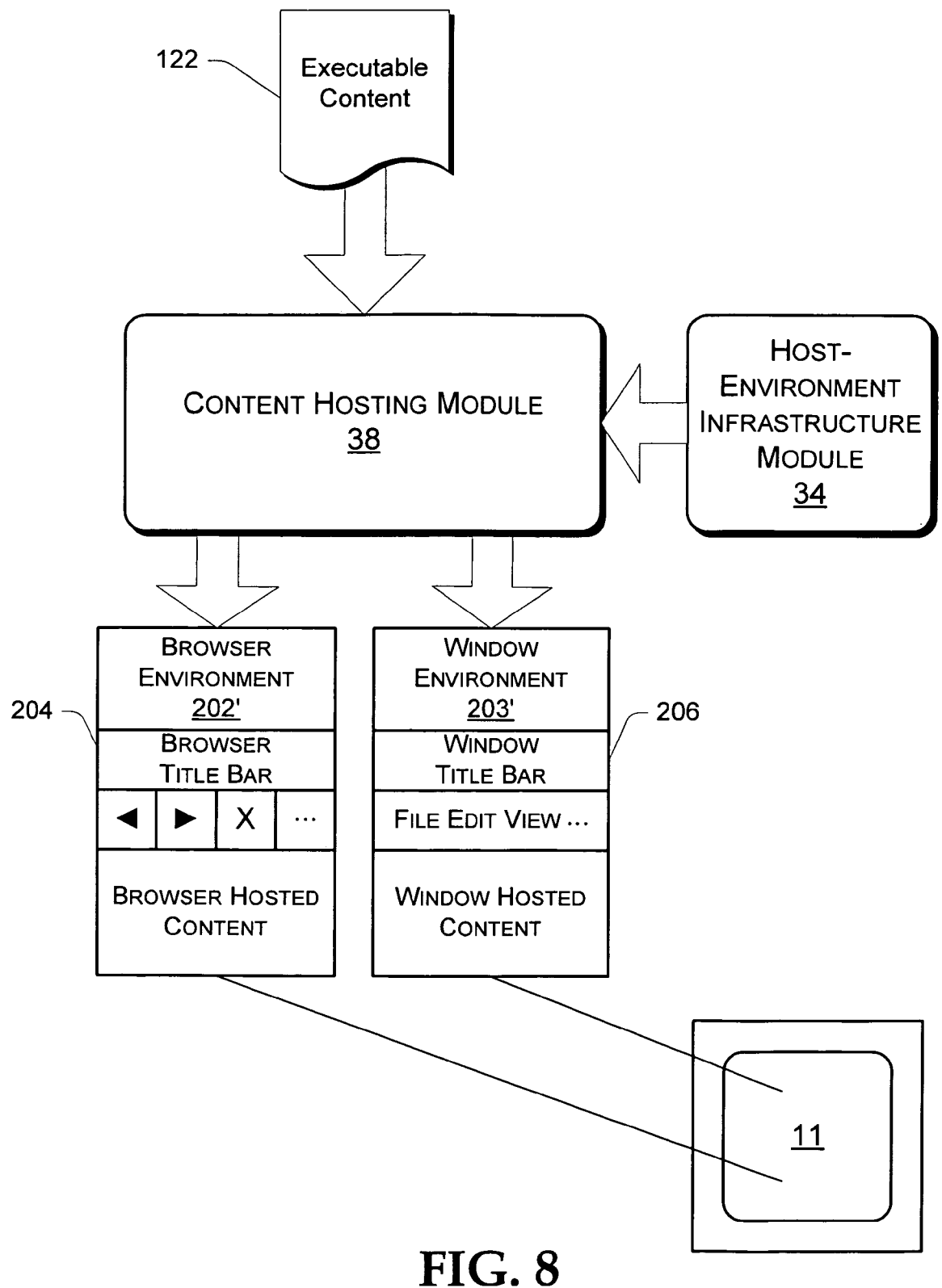
FIG. 8 is a functional block diagram of at least a portion of the process for executing host-environment independent content illustrated in FIG. 7.

Referring now to FIGS. 7-8, and beginning the method 200 at step 210, by way of example only, a user operating computer 10 launches or initiates execution of executable content 122 by activating a hyperlink (not illustrated) to the content 122 that is displayed in computer 10's display 11, for example, although executable content 122 may be launched by providing a Universal Resource Locator ("URL") through an address bar, by activating (e.g., double-clicking) an icon or some other representation of executable content 122, by being invoked by another component, or in other ways.

At step 220, content hosting module 36 examines one or more of the program modules associated with executable content 122, such as the settings module, to determine in which particular hosting environment content 122 will be executed, although module 36 may examine content 122 itself to determine the particular hosting environment, as disclosed in the '707 application to Alcazar et al., which has already been incorporated by reference herein.

At step 230, if it is determined above at step 220 that the executable content 122 will be executed in a browser environment 202', the YES branch is followed and step 240 is performed. If it is determined that the executable content 122 will be executed in a window environment 203', the NO branch is followed and step 250 is performed.

At step 240, the content hosting module 36 launches the browser environment 202' where the executable content 122 will be hosted at step 260 by providing the browser object 114 described above in connection with step 110 in method 100.

At step 250, the content hosting module 36 launches the window environment 203' where the executable content 122 will be hosted at step 260 by providing the window object 116 described above in connection with step 110 in method 100.

At step 260, the executable content 122 is executed in the particular environment (e.g., browser environment 202' or window environment 203') determined above at step 220 according to the application functionality 104 and the host-environment independent interactions 106. The browser object 114 or the window object 116, and hence the browser environment 202' or the window environment 203', respectively, will be customized for the executable content 122 based on the host-environment Independent interactions 106, as described in further detail herein below in connection with method 300.

An exemplary method 300 for interacting with a selected hosting environment according to host-environment independent interactions 106 will now be described with reference to FIG. 9 in the context of being carried out by system 8 described above in connection with FIGS. 1-2, with reference back to FIGS. 1-8. Further, this method 300 further describes step 260 discussed above in connection with method 200.

Referring now to FIG. 9, and beginning the method 300 at step 310, by way of example only, each portion of the hosted executable content 122 representing the host-environment independent interactions 106 call one or more methods on the host-environment abstraction wrapper object 108 for interacting with the selected hosting environment, although events and/or properties on the object 108 may also be handled or set, respectively. For instance, the portion of the pseudo-code example provided above for a host-environment independent interaction 106 comprising "Host-Environment_Abstraction_Wrapper.SetTitle" calls the "SetTitle" method that may be defined in the wrapper object 108 for setting the title for executable content 122 that is hosted in a selected hosting environment.

At step 320, if the executable content 122 is hosted in the browser environment 202', the YES branch is followed and step 330 is performed. If the executable content 122 is hosted in the window environment 203', the NO branch is followed and step 350 is performed.

At step 330, If the content 122 is hosted in the browser environment 202', then the host-environment abstraction wrapper object 108 calls one or more appropriate methods on the browser object 114 and provides the appropriate arguments into the call for implementing the interaction expressed by the host-environment independent interactions 106, although attributes may be set and/or event handlers may be registered for the object 1114. For instance, the portion of the pseudo-code example provided above for the wrapper object 108 comprising "Environment_Object.Set_Title(Title_Value)" calls the "Set_Title" method on the browser object 114 and provides the "foo" value for the "Title_Value" argument.

The wrapper object 108 either references the appropriate method, attribute or event on the browser object 114 via the host-environment interface 112 where the host-environment independent programming model 101(1) shown in FIG. 5 supports the executable content 122, or the object 108 directly references the appropriate method, attribute or event on the browser object 114 without the interface 112 where the model 101(2) shown in FIG. 6 supports the content 122.

At step 340, the appropriate method on the browser object 114 is executed and a property of the browser environment 202' is set according to the interaction expressed by the host-environment independent interaction 106, although an attribute may be set and/or an event handier may be registered for the object 114. For instance, the title (e.g., "foo") of the application embodied by the executable content 122 is displayed on a browser title bar 204 in the browser environment 202' shown in FIG. 8. One or more other host-environment independent interactions 106 expressed in the executable content 122 are executed in the same manner described herein, except other types of interactions may be expressed by the interactions 106, and the method 300 ends when the last interaction 106 is implemented.

At step 350, if the content 122 is hosted in the window environment 203', then the host-environment abstraction wrapper object 108 calls one or more appropriate methods on the window object 116 and provides the appropriate arguments into the call for implementing the interaction expressed by the host-environment independent interactions 106, such as for setting the title on the window object 116, although attributes may be set and/or event handlers may be registered for the object 116. As described above in connection with step 330, the wrapper object 108 either references the appropriate method, attribute or event on the window object 116 via the host-environment Interface 112 or the object 108 directly references the appropriate method, attribute or event on the window object 116 without the interface 112.

At step 360, the appropriate method on the window object 116 is executed and a property of the window environment 203' is set according to the interaction expressed by the host-environment independent interaction 106, such as the title (e.g., "foo") of the application embodied by the executable content 122, although an attribute may be set and/or an event handler may be registered for the object 116. The title may be displayed on a window title bar 206 in the window environment 203' shown in FIG. 8. One or more other host-environment independent interactions 106 expressed in the executable content 122 are executed in the same manner described herein, except other types of interactions may be expressed by the interactions 106, and the method 300 ends when the last interaction 106 is implemented.

Having described methods 100, 200 and 300 above, an example will now be provided to demonstrate the utility in developing host-environment independent content 102 and/or one or more supporting components, with reference back to methods 100, 200 and 300 and FIGS. 1-9. By way of example only, host-environment independent content 102 is developed and compiled in the same manner described above in connection with method 100. Thus, the developer generates the host-environment independent content 102 by including the functionality 104 and one or more host-environment independent interactions 106 in the content 102. For instance, the developer sets a title for the content 102 using one of the interactions 106.

At step 120, the content developer includes information in the settings module associated with the host-environment independent content 102 being compiled that indicates the executable content 122 will be hosted In a browser environment, although the developer could indicate a window environment instead. The content 102 is then compiled and executable content 122 is generated and stored at step 130. The executable content 122 is then executed in the browser environment 202', as shown in FIG. 8 and described in connection with methods 200 and 300 illustrated in FIGS. 7 and 9, respectively.

At some later point, the content developer may decide that they would like to execute the executable content 122 in a window environment 203' instead of the browser environment 202'. If the host-environment independent content 102 was compiled at step 120 utilizing early binding, then the content developer modifies the settings module associated with the content 102 to indicate that the executable content 122 will be hosted in the window environment 203'. Further, the developer uses the builder/compiler module 32 to recompile the host-environment independent content 102. However, the developer does not need to modify the host-environment independent content 102 to enable the executable version of the content 102 to executed in the window environment 203'.

On the other hand, if the host-environment independent content 102 was compiled at step 120 utilizing late binding, then the content developer modifies the settings module associated with the content 102 to indicate that the executable content 122 will be hosted in the window environment 202'. The developer or another computer 10 user can now execute the content 122 as described above in connection with methods 200 and 300, and the content 122 is hosted in the window environment 203' illustrated in FIG. 8. However, the developer does not need to modify the host-environment independent content 102 to enable the executable version of the content 102 to be executed in the window environment 203' nor does the developer need to recompile the host-environment independent content 102.

In sum, examples of methods 100, 200 and 300 for developing, supporting and using host-environment agnostic content have been provided above to provide the reader of this disclosure with a basic understanding of the concepts disclosed herein. It should be appreciated, however, that methods 100, 200 and 300 are provided as examples only and should not be construed to limit the ensuing claims. The pseudo-code examples provided above earlier, again, are merely used for demonstrative and explanatory purposes only as their associated functions may be implemented in many other ways and may include additional information, such as information for implementing other interactions in addition to setting a title property in a hosting environment as described above.

For instance, the pseudo-code example of a portion of the "Host-Environment_Abstraction_Wrapper" class representing an API provided above earlier that may be instantiated into host-environment abstraction wrapper object 108 for setting a title property for an application embodied by the host-environment independent content 102 may support additional functionalities or interactions besides just setting a title property. As mentioned above, setting a title property for the content 102 is but one of many properties that may be set via the interactions 106.

As such, a more comprehensive example of the "Host-Environment_Abstraction_Wrapper" class representing an API that may be instantiated into host-environment abstraction wrapper object 108 for setting other properties in either a browser or window environment is provided below:

---

Host-Environment_Abstraction_Wrapper Class Example:

---

```
class Host-Environment_Abstraction_Wrapper: IEnvironmentService {

// Properties public UIElement Child;            // Host-Environment_Abstraction_Wrapper 's child
    element
    public LayoutRange Height;         // Height of the hosting Window or Browser
    public IconData Icon;              // Icon on the hosting Window or Browser title bar
    public double Left;                // Left edge of the hosting Window or Browser
    public Point Location;             // Upper left corner of the hosting Window or Browser
    public INavigator Navigator;       // Inavigator Interface of the hosting NavigationWindow
    or Browser
    public StatusBar StatusBar;        // Status bar of the hosting Window or Browser
    public object StatusBarContent;    // Status bar content
    public string Text;                // Title of the hosting Window or Browser
    public double Top;                 // Top edge of the hosting Window or Browser
    public LayoutRange Width;          // Width of the hosting Window or Browser
    public WindowAutoLocation WindowAutoLocation;    // Initial location or the hosting
    Window or Browser
    public WindowState WindowState;    // Whether the window or browser is maximized,
    minimized, or normal
    protected override Ienumerator LogicalChildren;    // Enumerator for logical children of
    Host-Environment_Abstraction_Wrapper // Methods public Host-Environment_Abstraction_Wrapper( );        //constructor
    public object GetService(Type serviceType);    // obtains a service object
    public void IAddChild.AddText(String str);     // adds a child to the Host-
    Environment_Abstraction_Wrapper object
    public void IAddChild.AddChild(object obj);         // adds text to the Host-
    Environment_Abstraction_Wrapper object iself
    protected override Size ArrangeOverride(Size finalSize);    // override to arrange and size
    a window and its child elements
    protected override Size MeasureOverride(Size constraint);    // override to measure size
    of window
    protected virtual void OnActivated(object sender, EventArgs args);    // raises Activated
    event
    protected virtual void OnClosed(object sender, EventArgs args);    // raises Closed
    event
    protected virtual void OnClosing(object sender, CancelEventArgs args);    // raises
    Closing event
    protected virtual void OnDeactivated(object sender, EventArgs args);    // raises
    Deactivated event
    protected virtual void OnLoading(object sender, EventArgs args);    // raises Activated
    event
    protected virtual void OnLocationChanged(object sender, EventArgs args);    // raises
    Activated event
    protected virtual void OnSizeChanged(object sender, EventArgs args);    // raises
    SizeChanged event
    protected virtual void OnStateChanged(object sender, EventArgs args);    // raises
    StateChanged event
```

-continued

Host-Environment_Abstraction_Wrapper Class Example:

```
//Events
                    :
    public event EventHandler Activated;
    public event EventHandler Closed;
    public event CancelEventHandler Closing;
    public event EventHandler Deactivated;
    public event EventHandler Loading;
    public event EventHandler LocationChanged;
    public event EventHandler StateChanged;
}
                    :
```

Additionally, as described above in connection with methods 100, 200 and 300, one or more components In models 101(1) and 101(2) may be expressed as programmatic statements or declaratively. For instance, the host-environment independent content 102 with host-environment independent interactions 106 was described above in the context of comprising the source code of an application that may ultimately be compiled into executable content 122. Thus, the pseudo-code examples provided above in that context represented programmatic statements.

However, the host-environment independent content 102 could comprise other types of content besides source code that is ultimately compiled into executable content 122, such as mark-up language content that is not compiled yet may include host-environment independent interactions 106 that may be used to set properties on a hosting environment in the same manner described above.

To illustrate this concept, a programmatic pseudo-code example of a host-environment independent interaction 106 for setting various properties in a hosting environment for the content 102 where the content 102 is ultimately compiled into content 122 as described above is provided herein below, followed with a declarative pseudo-code example of the same interaction 106:

Host-Environment Independent Interaction
Programmatic Pseudo-Code Example:

```
                    :
    Host-Environment_Abstraction_Wrapper.Height=400;
    Host-Environment_Abstraction_Wrapper.Width=600;
    Host-Environment_Abstraction_Wrapper.Text="foo";
                    :
```

The host-environment independent interaction programmatic pseudo-code example above sets size properties (e.g., height and width) for a hosting environment (e.g., browser or window frame) and a title for the content 102 hosted in the environment via the host-environment abstraction wrapper object 108.

Where the host-independent content 102 comprises information that will not ultimately be compiled into executable content 122, such as markup language content, the content 102 may include host-environment independent interactions 106 that are expressed declaratively and may be used to access methods, attributes and/or events exposed by the host-independent abstraction wrapper object 108 in the same manner described above where a late-bound implementation of the host-environment abstraction wrapper 108 is used.

As such, a declarative pseudo-code version of a host-environment independent interaction 106 that may be used to set the same hosting environment properties that are set in the programmatic pseudo-code example provided above is provided herein below:

Host-Environment Independent Interaction
Declarative Pseudo-Code Example:

```
                    :
    < Host-Environment_Abstraction_Wrapper Height="400"
    Width="600" Text="foo">
                    :
    </Host-Environment_Abstraction_Wrapper>
                    :
```

Here, the declarative pseudo-code for the interaction 106 instructs the hosting environment, via the host-independent abstraction wrapper 108, to set the size properties (e.g., height and width) for the hosting environment and the title for the content 102 hosted in the environment, for example. The declarative pseudo-code provided above in this example is in the XAML markup language, although other types of markup languages may be used. An example of the XAML markup language is disclosed in U.S. patent application Ser. No. 10/715,136 to Bogdan et al., entitled "SYSTEM AND METHOD FOR COMPILING MARKUP FILES," filed Nov. 18, 2003, which is incorporated herein by reference in its entirety.

It should also be noted that the system 8 and methods 100, 200 and 300 have been described above in the context of utilizing object-oriented programming concepts where data types, referred to as classes herein, are defined along with associated data (e.g., attributes, properties) and instructions (e.g., methods, events). It should be appreciated, however, that the system 8, methods 100, 200 and 300, and the components in models 101(1) and 101(2) may be implemented utilizing procedure-oriented, logic-oriented, rule-oriented and constraint-oriented programming methodologies, or combinations thereof.

Furthermore, while the memory module 20 illustrated in FIGS. 1-2 is described above as comprising computer storage media, the module 20 should be broadly interpreted to cover communication media as well. Communication media may embody computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example only, communication media includes wired media, such as a wired network or direct-wired connection, and wireless media, such as acoustic, RF, infrared, other wireless media, and combinations thereof.

Alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefor, is not intended to limit the claimed processes to any order except as may be specified In the claims.

What is claimed is:

1. At least one application program interface (API) embodied as one or more computer executable instructions stored on a computer-readable storage medium, which when executed by at least one processing system in conjunction with at least one application program that issues at least one call on a host-environment object on behalf of content, enables the content to interact with a selected hosting environment, the at least one API comprising:

at least one interaction interface in the content for indicating at least one desired interaction with any one of a plurality of hosting environments, including a browser environment and a window environment, the interaction interface being expressed in at least one of either one or more programmatic language statements, one or more declarative language statements, one or more extensible application markup oriented language (XAML) statements, or any other computer language statements; and at least one interaction expression in the at least one interaction interface for identifying the at least one desired interaction to the at least one application program without providing implementation instructions associated with any one of the plurality of hosting environments;

wherein the at least one application program comprises logic for identifying a selected hosting environment by examining a settings module associated with the at least one application program for referencing the host-environment object that is associated with the selected hosting environment for issuing the at least one call on, and for referencing an object interface that allows the at least one call on the host-environment object to be made on either a browser-environment object or a window-environment object that becomes available when the selected hosting environment is selected.

2. The API as set forth in claim 1 wherein the at least one interaction interface comprises at least one argument for enabling content specific information related to the at least one indicated interaction to be provided.

3. The API as set forth in claim 1 wherein the at least one call comprises at least one of either one or more method invocations, one or more event handler registrations, or one or more attribute value assignments.

4. The API as set forth in claim 1 wherein the host-environment object comprises at least one component for setting one or more properties in the selected hosting environment.

5. The API as set forth in claim 1 wherein the at least one application program comprises logic for referencing the host-environment object that represents either a browser environment object or a window environment object for issuing the at least one call on.

6. A computer-implemented method of communicating with at least one application program that issues at least one call on a host-environment object on behalf of content for enabling the content to interact with a selected hosting environment, the method comprising:

indicating, by a processor, in the content at least one desired interaction with any one of a plurality of hosting environments, wherein the hosting environments include a browser environment and a window environment; and identifying the at least one desired interaction in the content without providing implementation instructions associated with the selected hosting environment;

wherein the at least one application program comprises logic for identifying a selected hosting environment by examining a settings module associated with the at least one application program and for referencing the host-environment object that is associated with the selected hosting environment for issuing the at least one call on, wherein indicating and identifying the at least one desired interaction within the content are performed using at least one of either one or more programmatic language statements, one or more declarative language statements, one or more extensible application markup oriented language (XAML) statements, or any other computer language statements, and wherein issuing at least one call on at least one environment object further comprises referencing an object interface that allows the at least one call on the host-environment object to be made on a browser environment object or a window environment object that becomes available when the selected hosting environment is selected.

7. The computer-implemented method as set forth in claim 6 wherein issuing at least one call on a host-environment object further comprises at least one of either invoking at least one method, registering at least one event handler, or assigning at least one value to at least one attribute.

8. The computer-implemented method as set forth in claim 6 wherein issuing at least one call on a host-environment object further comprises identifying the selected hosting environment and referencing the host-environment object that is associated with the selected hosting environment for issuing the at least one call on.

9. The computer-implemented method as set forth in claim 6 wherein issuing at least one call on a host-environment object further comprises referencing the host-environment object that represents either a browser-environment object or a window-environment object for issuing the at least one call on.

10. A computer system that communicates with an implementation module which accesses a host-environment module on behalf of content for enabling the content to interact with a selected hosting environment, the system comprising:

a memory that stores an interaction interface module that indicates in the content at least one desired interaction with any one of a plurality of hosting environments, wherein the hosting environments include a browser environment and a window environment, and an interaction expression module that identifies the at least one desired interaction in the content for the implementation module without providing implementation instructions associated with the any one of the plurality of hosting environments; and a processor that processes the interaction interface module and the interaction expression module;

wherein the interaction interface module and the interaction expression module comprise at least one of either one or more programmatic language statements, one or more declarative language statements, one or more extensible application markup oriented language (XAML) statements, or any other computer language statements, and wherein the implementation module identifies a selected hosting environment by examining a settings module associated with the implementation modules, references the host-environment module that is associated with the selected hosting environment, and references an object interface module that allows accessing the host-environment module by issuing at least one call on a browser environment module or a window environment module that becomes available when the selected hosting environment is selected.

11. The computer system as set forth in claim 10 wherein the implementation module accesses the host-environment module by issuing at least one call comprising at least one of either invoking at least one method, registering at least one event handler, or assigning at least one value to at least one attribute.

12. The computer system as set forth in claim 10 wherein the implementation module references the host-environment module that represents either a browser object or a window object.

* * * * *